United States Patent
Neyer et al.

(10) Patent No.: US 6,838,156 B1
(45) Date of Patent: Jan. 4, 2005

(54) METHOD FOR LINKING TWO PLASTIC WORK PIECES WITHOUT USING FOREIGN MATTER

(75) Inventors: Andreas Neyer, Iserlohn (DE); Matthias Jöhnck, Münster (DE)

(73) Assignee: Aclara Biosciences, Inc., Mountain View, CA (US)

( * ) Notice: Subject to any disclaimer, the term of this patent is extended or adjusted under 35 U.S.C. 154(b) by 57 days.

(21) Appl. No.: 10/088,922

(22) PCT Filed: Mar. 29, 2000

(86) PCT No.: PCT/EP00/08584

§ 371 (c)(1),
(2), (4) Date: Aug. 22, 2002

(87) PCT Pub. No.: WO01/21384

PCT Pub. Date: Mar. 29, 2001

(30) Foreign Application Priority Data

Sep. 23, 1999 (DE) .......................................... 199 45 604

(51) Int. Cl.$^7$ ........................... B32B 3/00; B32B 31/00; H05B 6/00; B29L 59/16
(52) U.S. Cl. ........................ 428/172; 428/178; 210/203; 264/446; 264/482; 264/488; 156/272.8; 156/273.3; 156/275.1
(58) Field of Search ............................... 156/306, 311, 156/322, 272.2, 272.3, 275.1, 273.3, 272.8; 264/405, 445, 446, 482, 488; 428/172, 178, 188; 73/61.56; 210/203; 366/340; 422/101, 103

(56) References Cited

U.S. PATENT DOCUMENTS

| 3,950,206 A | * | 4/1976 | Adachi et al. ............ 156/272.6 |
| 3,997,386 A | * | 12/1976 | Oshida et al. ............ 156/309.9 |
| 4,447,488 A |   | 5/1984 | Simm et al. |
| 4,957,820 A | * | 9/1990 | Heyes et al. ................ 428/623 |
| 4,999,069 A | * | 3/1991 | Brackett et al. ............... 156/84 |
| 5,589,860 A |   | 12/1996 | Sugata et al. |
| 5,928,451 A | * | 7/1999 | Johansson et al. .......... 156/242 |

FOREIGN PATENT DOCUMENTS

| DE | 198 51 644 A1 | 8/1999 |
| EP | 0 589 351 A | 3/1994 |
| JP | 08118661 A | 5/1996 |
| WO | WO 94 29400 A | 12/1994 |
| WO | WO 99 51422 A | 10/1999 |

OTHER PUBLICATIONS

Schosser A. et al.: "Optical Components in Polymers", Jul. 12, 1995, Proceedings of the SPIE, US, SPIE, Bellingham, VA, vol. 2540, pp. 110–117.

Bicerano, J., "Glass Transition", Oct. 22, 2001. Encyclopedia of Polymer Science and Technology.

\* cited by examiner

Primary Examiner—Donald J. Loney
(74) Attorney, Agent, or Firm—David Albagli; Stephen C. Macevicz

(57) ABSTRACT

The invention relates to a method for linking two adjacent plastic work pieces (2, 3). The inventive method is characterized in that the intended contact zone (K) of at least one of the two work pieces (2) with which the latter adjoins to the other work piece (3) is at least partially subjected to a high-energy radiation to such an extent that the glass transition temperature is reduced in a marginal zone (R). The two work pieces (2, 3) are brought in the desired position relative to each other. For establishing the connection of the two work pieces (2, 3) at least the marginal zone (R) modified by the previous radiation process is heated at least in its surface area to a temperature that is higher than the glass transition temperature of the marginal zone (R) modified by the radiation process but lower than the glass transition temperature of the zones of the work pieces (2, 3) that have not been modified. The invention also relates to an article (1) produced according to the inventive method that consists of two work pieces (2, 3) that are linked without using foreign matte. The inventive article is characterized in that recesses (V), especially channel-shaped recesses, are introduced in at least one contact zone (K) of the two work pieces (2).

20 Claims, 3 Drawing Sheets

METHOD FOR LINKING TWO PLASTIC WORK PIECES WITHOUT USING FOREIGN MATTER

The invention relates to a method for the non-adhesive bonding of two contiguous plastic work pieces. The invention also relates to an article formed from at least two non-adhesively bonded work pieces, manufactured according to such method, and a preferred application of such an article.

Such methods are used, for example, in the bonding of microstructured work pieces, and they are also becoming increasingly important in the field of microfluidics for applications in reaction engineering, analytical technology, sampling technology and filtration technology, as well as in hydraulics and pneumatics. For such applications numerous miniaturized systems have been developed recently. The materials used are usually glass and silicon, and also thermoplastics. Regardless of the material used, in the fabrication of closed channels microstructures are first provided in a plane (substrate manufacturing), which in a following processing step are closed with a cover. While the process of anodic bonding is a suitable technology for glass and silicon, intensive worldwide efforts are underway to develop cost-effective methods for the bonding of microstructured plastic work pieces. Conventional bonding or adhesion methods such as the use of adhesives or heat seals, the classical method of thermo-welding, laser welding or ultrasound welding are problematic when plastics are used because of the stringent requirements for structural or dimensional stability in microtechnology. The insertion of thin-film electrodes, for example for generating an ion flow or for detecting a fluid channel which on the one hand should be easy to contact from the outside, but on the other hand should have direct contact with the medium in the closed channels, is particularly problematic because the thin-firm electrodes can become imperceptibly and unintentionally coated during the welding process.

From WO 99/51422, a method is known which is derived from classical thermo-welding, a solute thermoplastic is spun onto one or both polymer work pieces to be bonded. The solvent evaporates, and on the entire component remains a very thin film of the spun thermoplastics which has a lower melting point than the substrate or cover material. The bond is created by compression and heating to temperatures which are below the glass transition temperature of the substrate and cover material, but above that of the spun thermoplastics.

A disadvantage of the method described in the above named patent is that the solvent of the spun polymer can destroy the sensitive microstructures or nanostructures by partially or completely dissolving them. There is also the danger that corrosion cracks can occur in the microstructures. Furthermore, the microstructures or nanostructures can become plugged in the spinning process. This would make the resulting fluid structure unusable. There is also a danger that the thin-film electrodes may become coated.

Setting out from the discussed prior art, it is therefore the object of the invention to make an above named method available by which two plastic work pieces can be bonded to each other in a cost-effective manner and in a continuous manufacturing process.

This object is achieved according to the invention in that the intended contact surface of at least one of the two work pieces, with which it contacts the other work piece, is subjected to radiation of such a high energy level that the glass transition temperature is lowered in the marginal area, the two work pieces are brought into a mutual position in accordance with the intended use, and subsequently, to produce the bond of the two work pieces, at least the modified marginal layer in the area of its surface is heated to a temperature which is above the glass transition temperature of the marginal layer modified by radiation, but below that of the unmodified areas of the respective work piece.

With the method according to the invention, a marginal layer of the contact surface of at least one of the two work pieces, by which this work piece will be touching the other work piece in the subsequent bond, is modified in such a way that the glass transition temperature in this marginal layer is lowered in comparison with the other parts of this work piece. This is accomplished by radiating the contact surface with a high-energy radiation, such as a UV, laser, X ray and/or synchrotron radiation. During this radiation process, the long-chain polymers are destroyed, which causes a reduction in molecular weight and thus a lowering of the glass transition temperature. The intensity and duration of the radiation depend on the plastic to be modified and on the desired strength of the marginal layer to be modified. The thickness or depth of the modified marginal layer may be only a few $\mu m$ or fractions of a $\mu m$.

In a downstream processing step, the two work pieces are brought into a mutual position in accordance with the intended use. This can he done immediately following the radiation process or at any subsequent time.

Once the two work pieces are brought into a mutual position according to the intended use, the next processing step—the actual bonding step—is to heat at least the surface areas of the modified marginal layer to a temperature above the glass transition temperature of the modified marginal layer, but below the glass transition temperature of the work piece not modified in that manner. Due to the process of heating at least the surface areas of the modified marginal layer above its glass transition temperature, these softened marginal layers bond with the contact surface of the contiguous other work piece. This heating step can be accomplished either by selectively heating the modified marginal layer or appropriate parts thereof, as can be done, for example, by radiating with microwave radiation if the marginal layer is appropriately doped, or by heating the two work pieces together in the mutual position according to the intended use.

The main advantage of this method is that the bond between the two work pieces is accomplished without the use of extraneous materials, in particular without adhesives or solvents. Furthermore, the thickness of the modified marginal layer can be adjusted so that it is considerably smaller than the depth of a microstructure or nanostructure, thus avoiding the danger of a material flowing into and plugging such a structure during the bonding process. Furthermore, the two work pieces brought into a mutual position according to the intended use can be held under pressure in relation to each other during the process of heating the modified marginal layer, since the unmodified areas and those containing the structures are not softened and thus remain dimensionally stable. Furthermore, this method is suitable for the production of continuously manufactured articles consisting of two components, for example, for bonding two films, since the process of radiation and mutual alignment as well as the process of heating can be continuous when films are used.

The microstructure or nanostructure can be inserted into one of the two work pieces in an upstream processing step.

The method can also be used in such a way that the contact surfaces of both work pieces are subjected to the radiation process to develop such a modified marginal zone with a lowered glass transition temperature in both, so that both modified marginal layers are softened during the heating step and fuse together.

The method according to the invention is also particularly suitable for bonding two contiguous plastic work pieces when the contact surface of one work piece carries an electrode such as a structured thin-film electrode. By limiting the amount of material involved in the bonding process, which can be reduced to a minimum, this method—in contrast to the prior art—also prevents the electrodes from becoming covered by volatile constituents or molten material. Furthermore, when both work pieces be subjected to the radiation process, there is the advantage that the underground under the electrodes is not modified and thus remains dimensionally stable. This means that the electrode is not subjected to much mechanical stress during the bonding process and is therefore not damaged or destroyed by cracking, as may be the case with other thermal bonding processes when the softened underground yields under stress.

Below, the object of the invention is described by means of an embodiment and with reference to the drawings, where FIG. 1 shows a schematic three-dimensional view of a microfluid element consisting of two work pieces;

Figure 1:
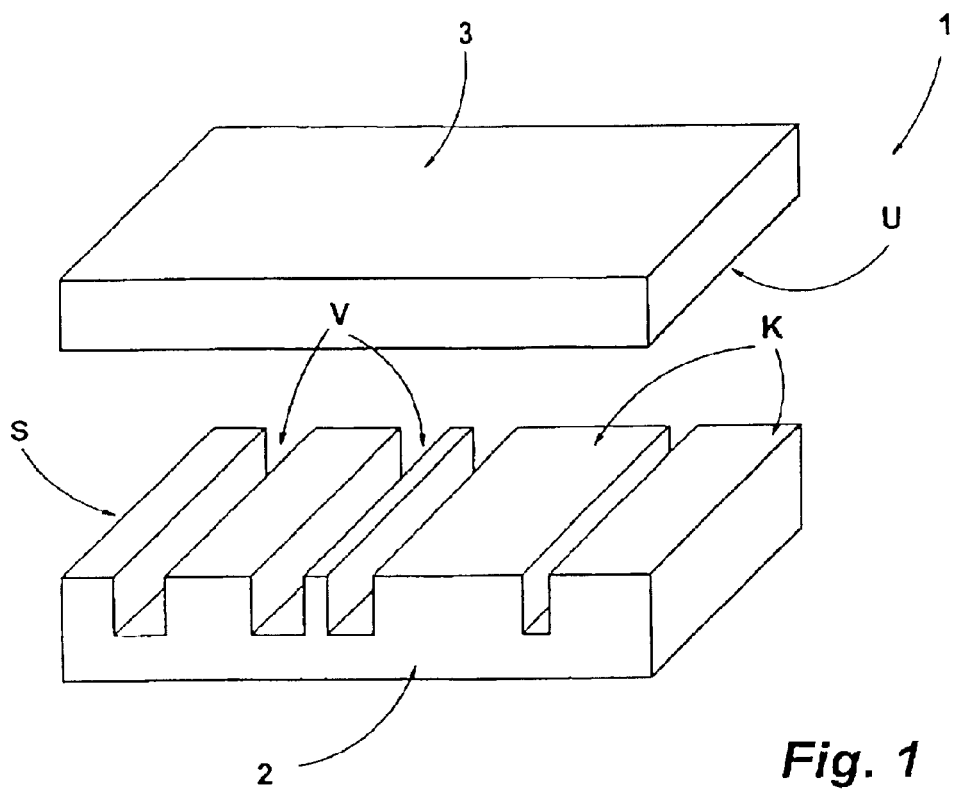

A microfluidic element 1, a partial view of which is shown in FIG. 1, consists of two work pieces 2, 3, which, when bonded together, form the microfluid element 1. Work pieces 2 and 3 are films made from a thermoplastic such as polymethylmethacrylate (PMMA). However, the thermoplastics may certainly also consist of polycarbonate or a polymethacryl, In general, any plastic can be used whose surface, when subjected to high-energy radiation, can be modified so that the glass transition temperature of the modified layer lies below that of the starting material. The top surface of work piece 2 has channel-like recesses V, resulting in a structured surface of work piece 2. The webs S which separate the recesses from each other and whose top surfaces are all arranged in the same plane, together form individual contact surfaces K, on which, bordering on the finished microfluid element 1, borders the underside U of work piece 3, which serves as the contact surface. Thus, work piece 3 serves as a cover for closing the recesses V of work piece 2, enabling them to form channels.

Figure 2:
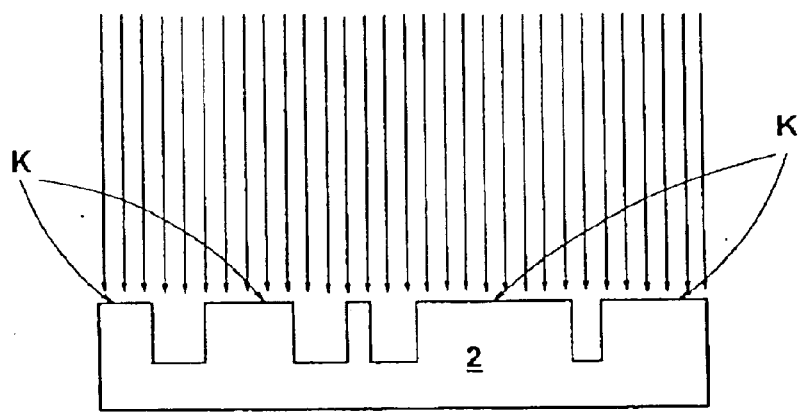
FIG. 2 shows one of the work pieces from FIG. 1, provided with microstructural recesses, in a first processing step.

To connect the two work pieces 2, 3, it is provided in a first step that the contact surfaces of the two work pieces 2, 3 (as shown in FIG. 2 only by means of work piece 2) are radiated by a high-energy radiation—indicated by the arrows—to achieve a lowering of the glass transition temperature in the marginal layer that borders on the top surface.

In the embodiment described here, the PMMA surface is preferably modified by UV radiation in the wavelength range of 250–280 nm. Practically any mercury vapour lamp whose tube is transparent in the appropriate wavelength range can be used for this purpose. The necessary radiation periods depend on the lamp intensity. The connection between intensity and depth of damage during the radiation of PMMA with a respective UV source is explained in detail in Frank et al (W. F. X. Frank, B. Knödler, A. Schösser, T. K. Strempel, T. Tschudi, F. Linde, D. Muschert, A. Stelmszyk, H. Strack, A. Bräuer, P. Dannberg, R. Göring, "Waveguides in Polymers"; Proceedings SPIE vol. 2290, pages 125–132.

In the example of PMMA, the lowering of the glass transition temperature is approximately 35° C., which means that in the embodiment described, the glass transition temperature was also lowered from 105° C. to 70° C.

The UV radiation of PMMA as a work piece material has been studied in detail by A. Schösser, B. Knödler, T. Tschudi, W. F. X. Frank, A. Stelmaszyk, D. Muschert, D. R ück, S. Brunner, F. Pozzi, S. Morasca. C. de Bernardi, "Optical components in polymers", SPIE, vol. 2540, pages 110–117; and radiation with X rays in LIGA-Verfahren [LIGA Method], W. Menz, J. Mohr, "Mikrosystemtechnik f ür Ingenieure" [Microsystems Technology for Engineers], VCH-Verlag, Weinheim, 1997. These indicate that such radiation causes substantially a reduction in the molecular weight of PMMA.

Figure 3:
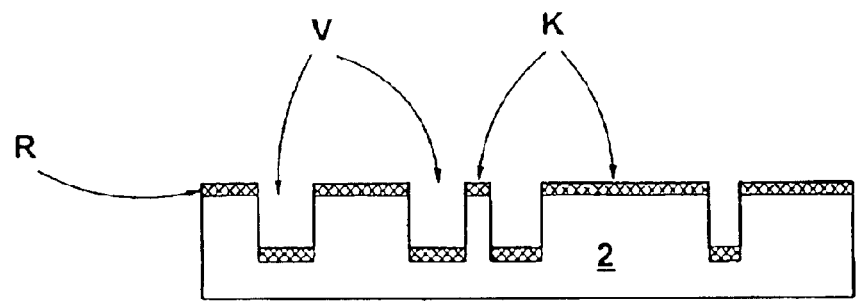
FIG. 3 shows the work piece from FIG. 2 after completion of the first processing step, with a modified marginal layer.

The marginal layer R of work piece 2, modified by the radiation process, is shown in FIG. 3; the modified marginal layer of work piece 3 is designed accordingly. The drawing explains not only that the contact surfaces K have a modified marginal layer R on the top surface, but also that the lowest point of recesses V has a corresponding marginal layer. However, the latter is of no consequence for the method of bonding the last work pieces 2, 3 with each other. It also does not affect the usability of the subsequently formed channel. Instead of radiating the entire surface of work piece 2, as shown in FIG. 2, radiation can also be selective, for example by introducing a mask, if only the marginal layers of certain sections, such as contact surfaces K, are to be modified as described.

In a next step, to bond the two work pieces 2, 3 together, work piece 3, which serves as a cover, is placed by its modified marginal layer R onto the contact surfaces K of work piece 2, so that the recesses V are closed and are now representing fluid channels. In this situation, it is practical to fix the two work pieces 2, 3 to each other, as indicated schematically by the two arrows pointing in opposite direction.

Figure 4:
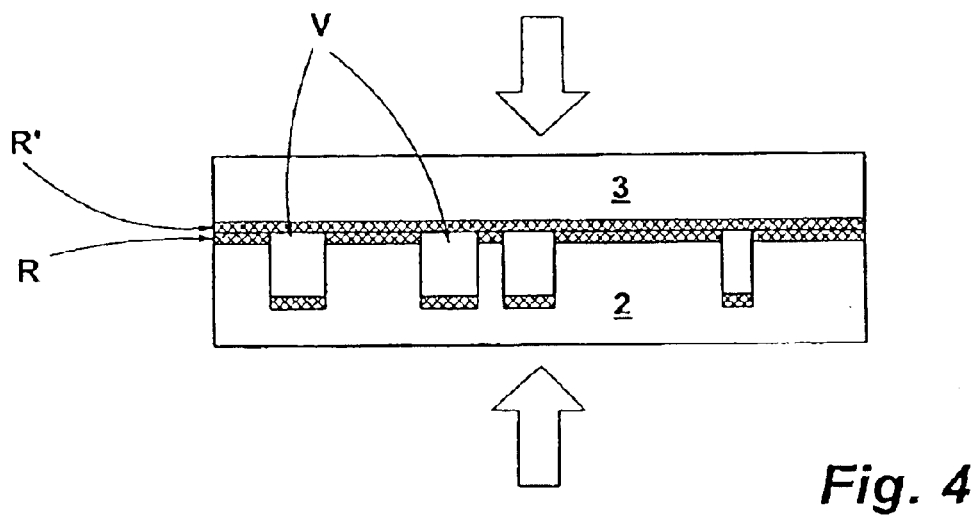
FIG. 4 shows the two work pieces from FIG. 1 brought into a mutual position in accordance with the intended use.
Figure 5:
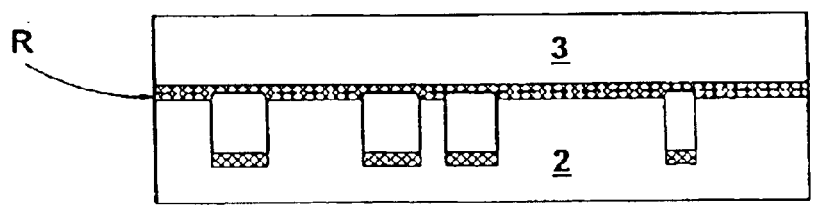
FIG. 5 shows the bonded work pieces from FIG. 4.

Finally, to produce a chemical bond between the two work pieces 2, 3, these are heated to a temperature that is above the glass transition temperature of the modified marginal layers R, R', but below that of the unmodified areas of work pieces 2, 3. In the embodiment shown, work pieces 2, 3 are heated to a temperature of about 90° C. After the modified marginal layers R, R' have exceeded their glass transition temperature (70° C.), they soften so that the two modified marginal layers R, R' fuse with each other. If, as also shown in FIGS. 4 and 5, the two work pieces 2, 3 exert pressure upon each other, this benefits the bonding process. After cooling down to below the glass transition temperature, work pieces 2, 3 are bonded. The former contact surface between the two work pieces 2, 3 is shaded in FIG. 5.

It should be emphasized that during this heating process, the glass transition temperature of the unmodified work piece sections is not exceeded. They retain their dimensional stability, and there is no danger that the recesses V are pinched or plugged during the bonding process.

In the design of microstructured components, it is practical when the two work pieces 2, 3 are made of the same material—as provided in the embodiment shown—, since the lateral walls of the channels that are formed have the same surface characteristics around the circumference, due to the homogeneous material. Thanks to the non-adhesive bond of the two work pieces 2, 3 and to the fact that they are made of identical material, the bond surface does not represent a potential weak point, as could happen, for example, in case of thermal stress, if different materials with different expansion coefficients are used.

Figure 6:
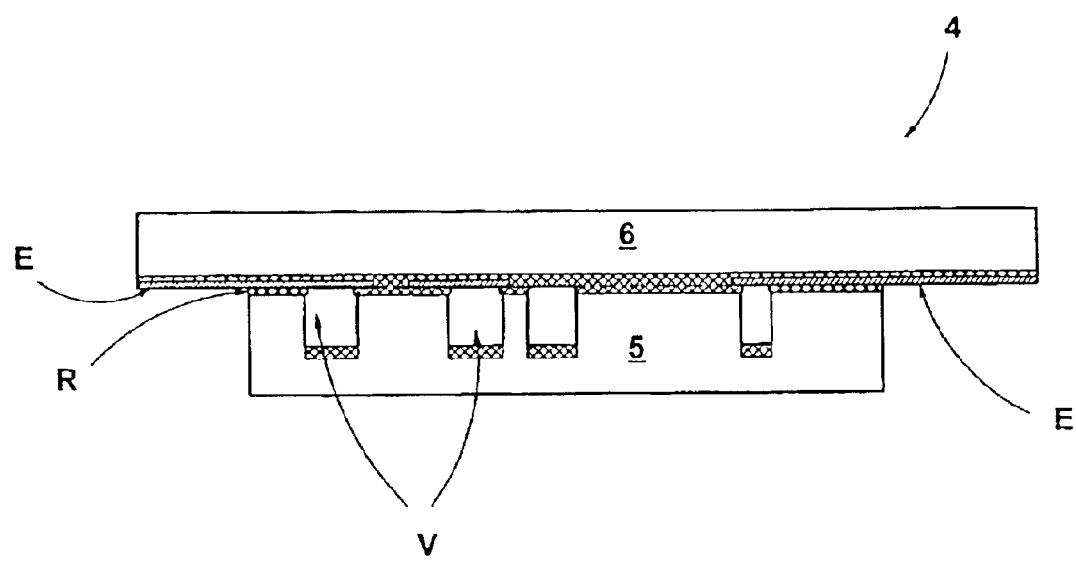
FIG. 6 shows a schematic cross section of another microfluid element with integrated thin-film electrodes.

FIG. 6 shows another microfluid element 4 formed by bonding two work pieces 5, 6, also both made of PMMA film. Work piece 5 is identical to work piece 2 of the previous embodiment. Work piece 6 is the cover for closing recesses V; in contrast to cover 3, it has electrodes E on the underside. The electrodes E extend to some recesses V o that measurements can be taken in the channels formed by recesses V in microfluid element 4, for example, to measure the conductivity of the fluid carried in such a channel. The two work pieces 5, 6 are bonded in the same manner as described in FIGS. 2 to 5, to form microfluid element 4. The description of the bonding method explains that it eliminates the danger of the surfaces of electrodes E, which form a lateral wall in some regions, being damaged or coated.

The bonding method according to the invention can be regarded as a hot-melt adhesion method, in which—as a result of a radiation-induced reduction in molecular weight—the hot-melt adhesion is produced by a marginal layer of the base material of the work pieces to be bonded.

What is claimed is:

1. Method for non-adhesive bonding of two contiguous plastic work pieces (2, 3; 5, 6) characterized in that:

the intended contact surface (K) of at least one of the two work pieces (2, 5 or 3, 6) by which it borders on the other work piece (3, 6 or 2, 5) is at least in some sections subjected to a high-energy radiation which causes the lowering of the glass transition temperature in a marginal layer (R, R'), the two work pieces (2, 3; 5, 6) are brought into a mutual position according to the intended use, and subsequently, to produce the bond of the two work pieces (2, 3; 5, 6) at least the modified marginal layer (R, R') in the area of its surface is heated to a temperature which is above the glass transition temperature of the marginal layer (R, R') modified by radiation, but below that of the unmodified areas of the respective work piece (2, 3; 5, 6).

2. Article (1, 4) formed of two work pieces (2, 3; 5, 6) non-adhesively bonded together, produced according to claim 1, characterized in that in at least one contact surface (K) of the two work pieces (2, 5), recesses (V), in particular channel-like recesses, are provided.

3. A hot-melt adhesion method for bonding two plastic work pieces, each work piece having an intended contact surface by which the two work pieces bond, the method comprising the steps of:

subjecting at least some sections of the intended contact surface of at least one of the work pieces to a high-energy radiation that causes the lowering of a glass transition temperature of such work piece in a marginal layer to produce a modified marginal layer;

contacting the intended contact surfaces of the two work pieces; and heating at least the modified marginal layer to a temperature above the glass transition temperature of the modified marginal layer but below that of the unmodified areas of the respective work piece so that a bond is formed between the two work pieces.

4. The hot-melt adhesion method of claim 3, wherein the entirety of said intended contact surface of at least one of said work pieces is subjected to said high-energy radiation.

5. The hot-melt adhesion method of claim 3, wherein at least some sections of both of said intended contact surfaces are subjected to said high-energy radiation to produce said modified marginal layer.

6. The hot-melt adhesion method of claim 3, wherein said high-energy radiation is selected from the group of UV, laser, X ray and synchrotron radiation.

7. The hot-melt adhesion method of claim 3, wherein both of said work pieces are heated in said heating step.

8. The hot-melt adhesion method of claim 3, wherein said intended contact surface contains microstructure or nanostructure recesses, and wherein said modified marginal layer is a fraction of a $\mu$m so that the microstructure or nanostructure recesses remain dimensionally stable during said step of heating.

9. The hot-melt adhesion method of claim 8, further characterized in that said recesses are not pinched or plugged as a result of said step of heating.

10. The hot-melt adhesion method of claim 3, wherein said work pieces are continuous films.

11. The hot-melt adhesion method of claim 3, 8, or 10, wherein said heating step further includes holding said work pieces under pressure in relation to each other.

12. A hot-melt adhesion method for bonding two plastic work pieces, each work piece having an intended contact surface by which the two work pieces bond and wherein one work piece is comprised of microstructure or nanostructure recesses in the contact surface and the other work piece includes electrodes on its contact surface, the method comprising the steps of:

subjecting at least some sections of the intended contact surface of at least one of the work pieces to a high-energy radiation that causes the lowering of a glass transition temperature of such work piece in a marginal layer to produce a modified marginal layer;

contacting the intended contact surfaces of the two work pieces; and heating at least the modified marginal layer to a temperature above the glass transition temperature of the modified marginal layer but below that of the unmodified areas of the respective work piece while the two work pieces are under pressure in relation to each other so that a bond is formed between the two work pieces.

13. An article for microfluidics applications comprising:

a first and a second plastic work piece, each having a contact surface by which the two work pieces are hot-melt adhesion bonded together; wherein microstructure or nanostructure recesses are provided in the contact surface of the first work piece; and a modified marginal layer is produced by high-energy radiation in at least a section of at least one of the contact surfaces, such that the modified marginal layer is characterized by a glass transition temperature lower than that of unmodified areas of the respective work piece.

14. The article according to claim 13, wherein electrodes are provided on said contact surface of said second work piece.

15. The article according to claim 13 or 14, wherein said modified marginal layer is a fraction of a $\mu$m so that the microstructure or nanostructure recesses remain dimensionally stable.

16. The article according to claim 15, wherein said microstructure or nanostructure recesses are further comprised of a filter structure.

17. The article according to claim 15, wherein said microstructure or nanostructure recesses are used as a microanalysis unit.

18. The article according to claim 13, characterized in that said recesses are not pinched or plugged as a result of said bonding.

19. The article according to claim 13, wherein said two work pieces are made of the same material.

20. The article according to claim 13, wherein at least one of said work pieces is made of one of the group consisting of PMMA, polycarbonate and polymethacryl.

* * * * *